United States Patent

Nemoto et al.

[11] Patent Number: 5,956,798
[45] Date of Patent: Sep. 28, 1999

[54] MAT FOR REMOVING DIRTS OR DUSTS

[75] Inventors: Hisashi Nemoto, Tokyo; Kiyoyuki Takesako, Yokohama, both of Japan

[73] Assignee: Shinon Denkisangyo Kabushiki-Kaisha, Tokyo, Japan

[21] Appl. No.: 08/826,592

[22] Filed: Apr. 3, 1997

[30] Foreign Application Priority Data

Aug. 13, 1996 [JP] Japan ................................. 8-231471

[51] Int. Cl.$^6$ ................................................. A47L 13/40
[52] U.S. Cl. ................................. 15/215; 15/216; 15/217; 15/1.51
[58] Field of Search .................. 15/215, 216, 217, 15/1.51

[56] References Cited

U.S. PATENT DOCUMENTS

| | | | |
|---|---|---|---|
| 3,945,647 | 3/1976 | Rangabe | 15/1.51 |
| 4,208,696 | 6/1980 | Lindsay et al. | 361/212 |
| 4,363,071 | 12/1982 | Rzepecki et al. | 361/220 |
| 4,484,250 | 11/1984 | Rzepecki et al. | 15/215 |
| 4,917,942 | 4/1990 | Winters | 96/99 |
| 5,376,168 | 12/1994 | Inculet | 15/1.51 |
| 5,405,434 | 4/1995 | Inculet | 15/1.51 |
| 5,524,317 | 6/1996 | Nagahama et al. | 15/215 |

*Primary Examiner*—Krisanne Thornton
*Assistant Examiner*—Fariborz Moazzam
*Attorney, Agent, or Firm*—Lowe Hauptman Gopstein Gilman & Berner

[57] ABSTRACT

A mat for removing dirts or dusts comprises a cushioning material made of a plurality of curled elastomeric filaments and a collector sheet of electret laying under the cushioning material. The filaments are formed of a compound of synthetic resinous material and a powdered electrical conductive material, and entangled with each other to provide a plurality of through holes or voids extending vertically through the cushioning material.

8 Claims, 1 Drawing Sheet

MAT FOR REMOVING DIRTS OR DUSTS

BACKGROUND OF THE INVENTION

1. Technical Field

The present invention relates to a mat suitable for removing dirts or dusts from the underside of footgear such as shoes or slippers.

2. Description of the prior art

The foreign materials such as dirts or dusts prevailing over the floor are adapted to be attracted electrostatically through the electric charge generated through the friction produced between the underside of footgear and the floor during walking.

Dirts or dusts attracted or adhered on the underside of the footgear should be removed to keep the room clean. Specifically, as for the cleanroom, dusts must be inhibited from getting thereinto, and for such purpose, a mat for removing dirts or dusts is be provided at the entrance to the cleanroom.

In the case of the prior art mat, self-adherant material or adhesive is applied thereon, and the foreign materials on the underside of the footgear are bonded to the adhesive on the mat and removed thereby.

However, once the dirts or dusts are bonded on a part of the mat, the self-adherant property of the part is reduced substantially, so that repeatedly utilizing the same part of the mat to remove the foreign material is essentially impracticable. In addition, washing the mat with water to remove the foreign material to restore the self-adherant property is very difficult. In other words, the prior mat may not be economically feasible.

Although some prior art dust removing mats may have a brush-shaped surface to remove the dirt or dust, the removed material tends to scatter in every directions while the mat is pressed by the footgear. In other words, a problem is present in dealing with the dirt or dust removed by such mat.

Accordingly the object of the present invention is to provide a mat which can eliminate the problem encountered in the prior art mat.

Another object of the present invention is to provide a mat of highly enhanced long lasting dust removing property. The mat can be washed in water and utilized repeatedly.

SUMMARY OF THE INVENTION

These and other objects are achieved by a mat for removing dirts or dusts in accordance with the present invention comprising a cushioning material made of a plurality of elastomeric filaments comprising a mixture of synthetic resinous material and a powdered electrical conductive material, said filaments are entangled each other to provide a plurality of through holes or voids extending vertically therethrough, and a collector sheet of electret laying under the cushioning material.

Particularly, the mat for removing dirts or dusts in accordance with the present invention comprising a cushioning material made of a plurality of elastomeric filaments comprising a mixture of vinyl chloride and a powdered carbon, said filaments are entangled each other to provide a plurality of through holes or voids extending vertically therethrough, and a collector sheet of electret laying under the cushioning material, wherein said sheet comprising an electrostatically chargeable upper sheet and a lower sheet of synthetic resin bonded to the upper sheet.

More particularly, the collector sheet of electret includes the upper sheet formed by non woven sheet of polypropylene fiber, and the lower sheet formed by non woven sheet of nylon fiber.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
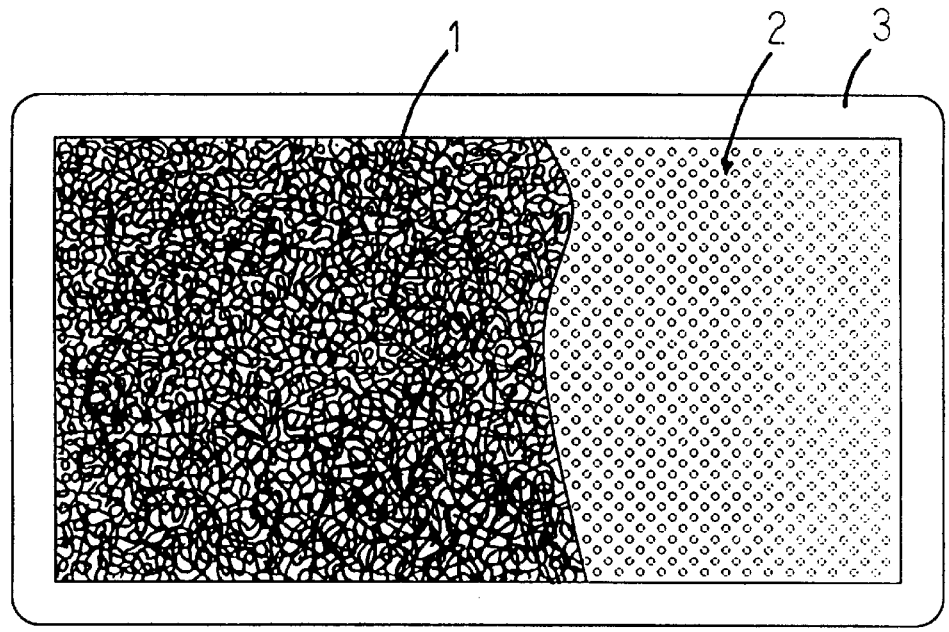
FIG. 1 is a partially broken plan view showing the mat of the present invention.
Figure 2:
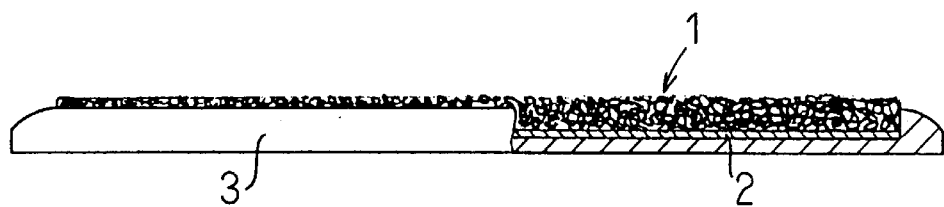
FIG. 2 is a partially broken vertical elevational view of the mat shown in FIG. 1.
Figure 3:
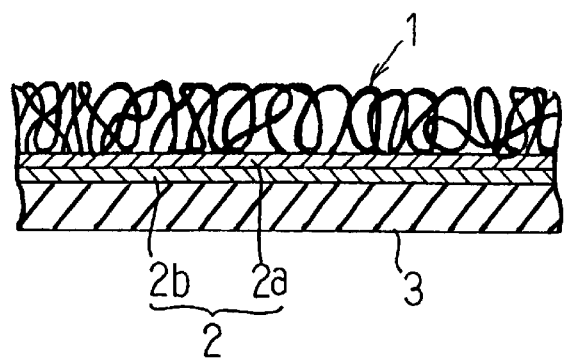
FIG. 3 is an enlarged vertical sectional view of the mat of the present invention.

A mat for removing dirts or dusts of the present invention will now be described with reference to the embodiment shown shematically in the attached drawings.

A mat for removing dirts or dusts of the present invention will be referred to as "dust removing mat" or "dust free mat" hereinbelow for the sake of simplicity.

The mat of the present invention comprises a cushioning material 1, a collector sheet 2 laying immediately below the material, and a base 3 for supporting the cushion 1 and the sheet 2.

The cushioning material 1 is made of a plurality of curled or coiled filaments entangled with randomly each other to provide a plurality of through holes or voids extending vertically from the top surface of the cushion 1 to the the bottom surface thereof. The diameter of the filament is, for example, within the range from 0.8 mm to 1.0 mm. Each filament is formed of a compound comprising a synthetic resinous material such as vinyl chloride resin blended with a powdered electrical conductive material such as carbon. The electrical surface resistivity of the filament is preferably within the range from $1 \times 10^5$ to $1 \times 10^{10}(\Omega)$.

The collector sheet 2 is made of 2-ply sheet material comprising upper and lower sheets 2a and 2b laying one on top of the other. The upper sheet 2a is electrostatically chargeable, for example, made of a non woven sheet of polypropylene fibrous material. The diameter of the fibrous material is for example 2 $\mu$m. Specifically, the material is an electret electrically charged at about 0.6(nQ) formed under the presence of the voltage of 40,000(v). The lower sheet 2b is made of non woven material of synthetic resinous material such as nylon.

The upper and lower sheets 2a and 2b are bonded together by means of ultrasonic welding to form the collector sheet 2. Further, the collector sheet 2 is embossed to form the surface thereof to have a pattern of plurality of convexed and concaved shapes.

The base 3 is made of synthetic rubber, so that the frictional resistance and the flexibility of the base is relatively high.

In the aforementioned dust removing mat of the present invention, the mat is deformed substantially in a concave shape while stepping in the mat, so that relatively larger perticles of dusts on the sole of the footgear may be removed physically through the friction with the cushioning material.

On the other hand, relatively smaller perticles attracted electrostatically on the surface of the sole will also depart therefrom at the contact with the mat. This is because the static electricity of the charged particle is attenuated substantially through the surface of the filament of reduced resistance.

Thus departed particles are attracted electrostatically by means of collector sheet 2 of electret laying under the mat 1 through the vertically extending plurality of through holes or voids of the mat.

The mat of the present invention will present the following advantages.

(a) The scattering of the smaller particles attracted on the collector sheet under the effect of air pressure caused by the stepping in of the footgear is avoided;

(b) In contrast with the prior art mat, in which the self-adherant property of the once stepped part is reduced substantially, the mat of the present invention can be used for a relatively long term. This is because the present mat will preserve its capability as a dust collector, even if stepped repeatedly;

(c) The collected dust particles can be disposed of as a whole with the collector sheet. The collector sheet may either be interchanged with new one, or may be restored by washing with water and reused;

(d) The cushioning material can be cleaned by washing by water and reused repeatedly; and (e) The base does not slip on the floor due to its high frictional resistance.

The mat of the present invention providing the above mentioned functions and effects will, in the case that the mat is positioned at the entrance to the cleanroom, serve to inhibit entry of the dust particles and the like to keep cleanliness of the room.

While particular embodiments of the present invention have been illustrated and described, it should be obvious to those skilled in the art that various changes and modifications can be made without departing from the spirit and scope of the invention.

What is claimed is:

1. A mat for removing dirt from footgear soles or dust comprising:

a cushioning material made of a plurality of elastomeric filaments comprising a mixture of synthetic resinous material and a powdered electrically conductive material, said filaments entangled with each other to provide a plurality of through holes or voids extending vertically therethrough from a top surface to a bottom surface thereof, and a collector sheet of electret laying under the cushioning material.

2. A mat for removing dirt from footgear soles or dust comprising:

a cushioning material made of a plurality of elastomeric filaments comprising a mixture of vinyl chloride and a powdered carbon, said filaments being entangled with each other to provide a plurality of through holes or voids extending vertically through said cushioning material from a top surface thereof to a bottom surface thereof, and a collector sheet of electret laying under the cushioning material, wherein said sheet comprises an electrostatically chargeable upper sheet and a lower sheet of synthetic resin bonded to the upper sheet.

3. The mat according to claim 2 wherein the upper sheet is formed by a non woven sheet of polypropylene fiber, and the lower sheet is formed by a non woven sheet of nylon fiber.

4. A mat for removing dirt or dust comprising:

a cushioning material made of a plurality of elastomeric filaments comprising a mixture of synthetic resinous material and a powdered electrically conductive material, said filaments being entangled with each other to provide a plurality of through holes or voids extending vertically through said cushioning material from a top surface thereof to a bottom surface thereof, and a collector sheet of electret laying under the cushioning material, said collector sheet being disposed on a base of a material having flexibility and surface frictional resistance sufficiently high to prevent a slip on a floor.

5. The mat according to claim 4 wherein the base is made of a synthetic rubber.

6. A mat as recited in claim 4, wherein said through holes extend vertically from said top surface of said cushioning material to said collector sheet of electret, thereby to provide a passageway for dirt and dust attracted by said collector sheet to pass from said cushioning material to said collector sheet.

7. A mat as recited in claim 4, wherein said top surface of said cushioning material is positioned for contacting footgear soles and for dynamically removing relatively larger particles therefrom by friction therewith and for electrically discharging the footgear soles thereby to facilitate removal therefrom of relatively smaller particles electrostatically engaged thereby.

8. A mat as recited in claim 7 wherein said collector sheet electrostatically attracts said larger and said smaller particles thereto and wherein said through holes extend vertically from said top surface of said cushioning material to said collector sheet of electret, thereby to provide a passageway for dirt and dust to pass from said cushioning material to said collector sheet.

* * * * *